(12) United States Patent
Fukunaga et al.

(10) Patent No.: US 7,885,280 B2
(45) Date of Patent: Feb. 8, 2011

(54) PACKET RELAYING APPARATUS AND PACKET RELAYING METHOD

(75) Inventors: Hideyo Fukunaga, Fukuoka (JP); Takeshi Sumou, Fukuoka (JP); Tsutomu Noguchi, Fukuoka (JP); Katsumi Imamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 12/320,488

(22) Filed: Jan. 27, 2009

(65) Prior Publication Data

US 2009/0252035 A1 Oct. 8, 2009

(30) Foreign Application Priority Data

Apr. 8, 2008 (JP) ............................. 2008-100793

(51) Int. Cl.
*H04L 12/28* (2006.01)
(52) U.S. Cl. ..................... 370/412; 710/240; 710/263
(58) Field of Classification Search ......... 370/412–418; 710/200, 240–244
See application file for complete search history.

(56) References Cited

U.S. PATENT DOCUMENTS

| | | | |
|---|---|---|---|
| 6,337,849 B1* | 1/2002 | Smith et al. .................. | 370/230 |
| 6,665,760 B1* | 12/2003 | Dotson ........................ | 710/240 |
| 2002/0024933 A1* | 2/2002 | Venken et al. ............... | 370/232 |
| 2005/0025158 A1* | 2/2005 | Ishikawa et al. ....... | 370/395.21 |
| 2005/0163127 A1* | 7/2005 | Choi et al. ............... | 370/395.4 |
| 2005/0268068 A1* | 12/2005 | Ignatius et al. .............. | 711/202 |
| 2008/0186989 A1* | 8/2008 | Kim ........................... | 370/412 |
| 2008/0298234 A1* | 12/2008 | Ishikawa et al. ............ | 370/230 |
| 2010/0054268 A1* | 3/2010 | Divivier ..................... | 370/412 |

FOREIGN PATENT DOCUMENTS

| | | |
|---|---|---|
| JP | 5-300170 | 11/1993 |
| JP | 9-83525 | 3/1997 |
| JP | 11-88348 | 3/1999 |
| JP | 2007-088994 | 4/2007 |

OTHER PUBLICATIONS

Japanese Office Action issued Feb. 16, 2010 in corresponding Japanese Patent Application 2008-100793.

* cited by examiner

*Primary Examiner*—Ayaz R Sheikh
*Assistant Examiner*—Mounir Moutaouakil
(74) *Attorney, Agent, or Firm*—Staas & Halsey LLP

(57) ABSTRACT

A packet relaying apparatus includes queues holding packet information, and queue control units controlling dequeueing. The dequeueing means transmission of packet information from a queue of a previous stage to a queue of a next stage. The packet relaying apparatus further includes a packet information control unit that, on receiving packet information to be dequeued at the time of dequeueing, returns discard information and data volume corresponding to the received packet information, a first bandwidth adjusting unit that, on determining that the received packet has been discarded, discards the packet information, maintains a usable bandwidth, and transfers the discard information and the data volume to the previous stage, and a second bandwidth adjusting unit that, on receiving the discard information and the data volume from the next stage, adds the data volume to the usable bandwidth and transfers the discard information and the data volume to a previous stage.

6 Claims, 12 Drawing Sheets

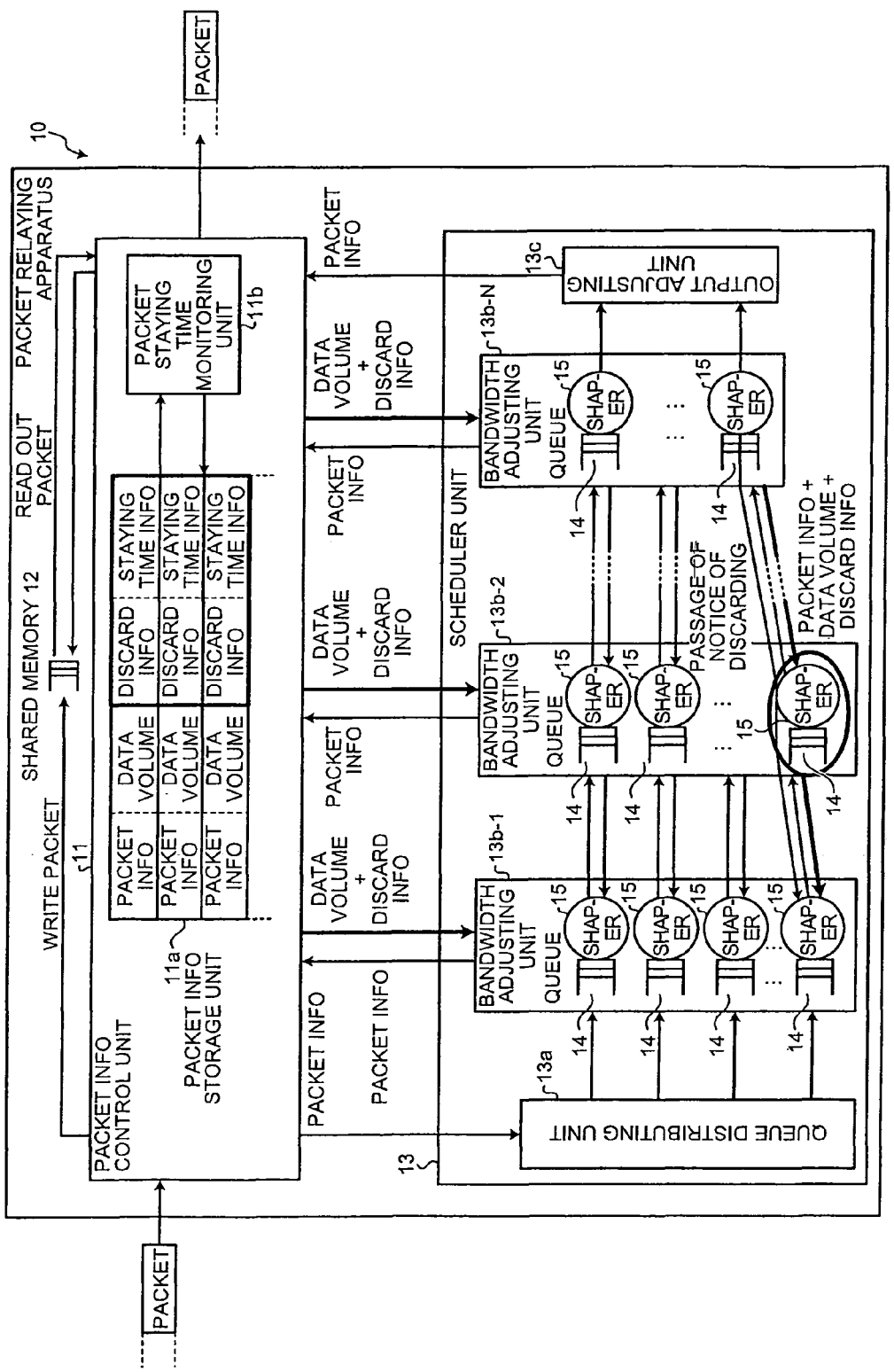

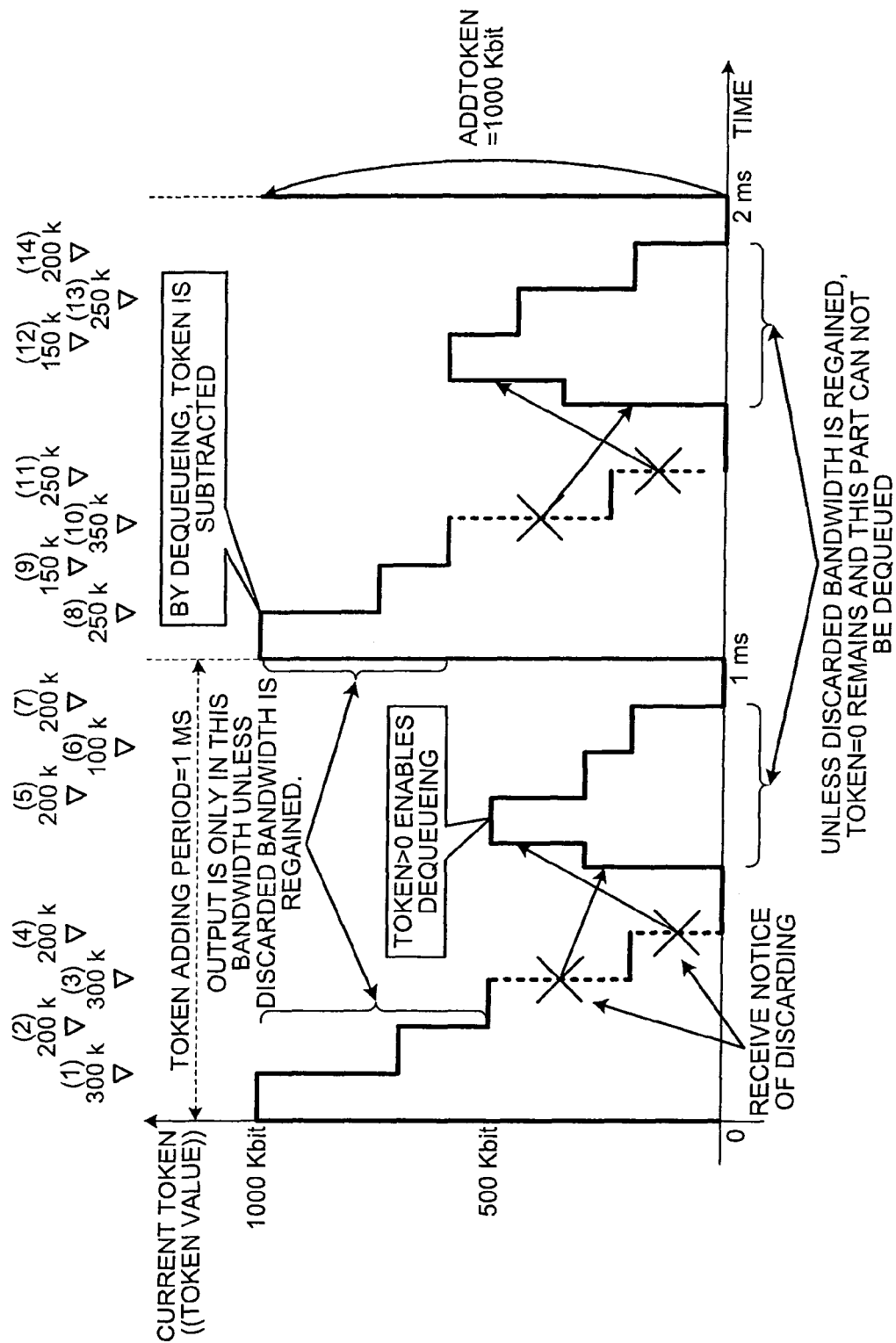

PACKET RELAYING APPARATUS AND PACKET RELAYING METHOD

CROSS-REFERENCE TO RELATED APPLICATION

This application is based upon and claims the benefit of priority of the prior Japanese Patent Application No. 2008-100793, filed on Apr. 8, 2008, the entire contents of which are incorporated herein by reference.

FIELD

The embodiments discussed herein are directed to a packet relaying apparatus, a packet relaying method, and a computer program product for packet relaying that transmit a packet by relaying.

BACKGROUND

Conventionally, a packet relaying apparatus performing a traffic control controls an output rate of packets to be output (see, e.g., Japanese Patent Application Laid-Open No. 2007-88994). Because such a packet relaying apparatus provides QoS (Quality of Service) by application or by user, an increasing number of queues of buffer memory are implemented for each destination (see FIGS. 9A and 9B). Furthermore, to enhance flexibility of a bandwidth control and a priority control, the multi-stage configuration is adopted in the queue, resulting in further complication.

In the packet relaying apparatus which tries to realize the increased number of queues and meet the demand of multi-stage configuration, high-priority packets are preferentially output, and low-priority packets tend to stay in the packet relaying apparatus for a longer period of time. As a result, low-priority packets left without being output sometimes fill up a shared memory.

To avoid such inconvenience, packets of long staying time are sequentially discarded, starting from an earliest-received packet. Specifically, each shaper in the packet relaying apparatus discards the packet at the head of the queue independently.

However, when each shaper discards the packet of long staying time independently, even if a first shaper dequeues a packet in a specified bandwidth, a shaper of the next stage by way of which the discarded packet information has passed has its bandwidth remaining dropped. As a result, the efficiency of an output bandwidth of the shaper deteriorates.

SUMMARY

It is an object of the present invention to at least partially solve the problems in the conventional technology.

According to an aspect of an embodiment, a packet relaying apparatus includes plural queues that hold packet information temporarily, plural queue control units that control dequeueing, dequeueing being transmission of packet information from a queue of a previous stage to a queue of a next stage, a packet information control unit that, on receiving packet information to be dequeued at the time of dequeueing, returns discard information indicative of whether a received packet corresponding to the packet information has been discarded and data volume of the received packet, a first bandwidth adjusting unit that, on determining that the received packet has been discarded according to the discard information returned by the packet information control unit, discards the packet information to be dequeued, maintains a usable bandwidth for output, and transfers the discard information and the data volume to the queue control unit of the previous stage, and a second bandwidth adjusting unit that, on receiving the discard information and the data volume transferred from the queue control unit of the next stage, adds the data volume to the usable bandwidth for output and transfers the discard information and the data volume to the queue control unit of a previous stage.

According to another aspect of an embodiment, a packet relaying method includes controlling packet information by, on receiving packet information to be dequeued at the time of dequeueing, returning discard information indicative of whether a received packet corresponding to the packet information has been discarded and data volume of the received packet, dequeueing being transmission of packet information from a queue of a previous stage to a queue of a next stage, firstly adjusting bandwidth by, on determining that the received packet has been discarded according to the discard information returned in the controlling, discarding the packet information to be dequeued, maintaining a usable bandwidth for output, and transferring the discard information and the data volume to a queue control unit of the previous stage, and secondly adjusting bandwidth by, on receiving the discard information and the data volume transferred from the queue control unit of the next stage, adding the data volume to the usable bandwidth for output and transferring the discard information and the data volume to the queue control unit of a previous stage.

According to still another aspect of an embodiment, a computer program product causes a computer to perform the method according to the present invention.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 1A and 1B are block diagrams of a configuration of a packet relaying apparatus according to a first embodiment;

FIG. 3 is a diagram of output bandwidth according to a Token bucket system;

DESCRIPTION OF EMBODIMENTS

Exemplary embodiments of a packet relaying apparatus, a packet relaying method, and a computer program product for packet relaying according to the present invention will be described in detail below with reference to the accompanying drawings.

[a] First Embodiment

Firstly, a configuration and a process flow of a packet relaying apparatus according to a first embodiment will be described. Then, an effect of the first embodiment will be discussed. The first embodiment describes an example where the present invention is applied to a packet switching apparatus, such as a router and a switch, employed in an IP network.

Figure 1B:
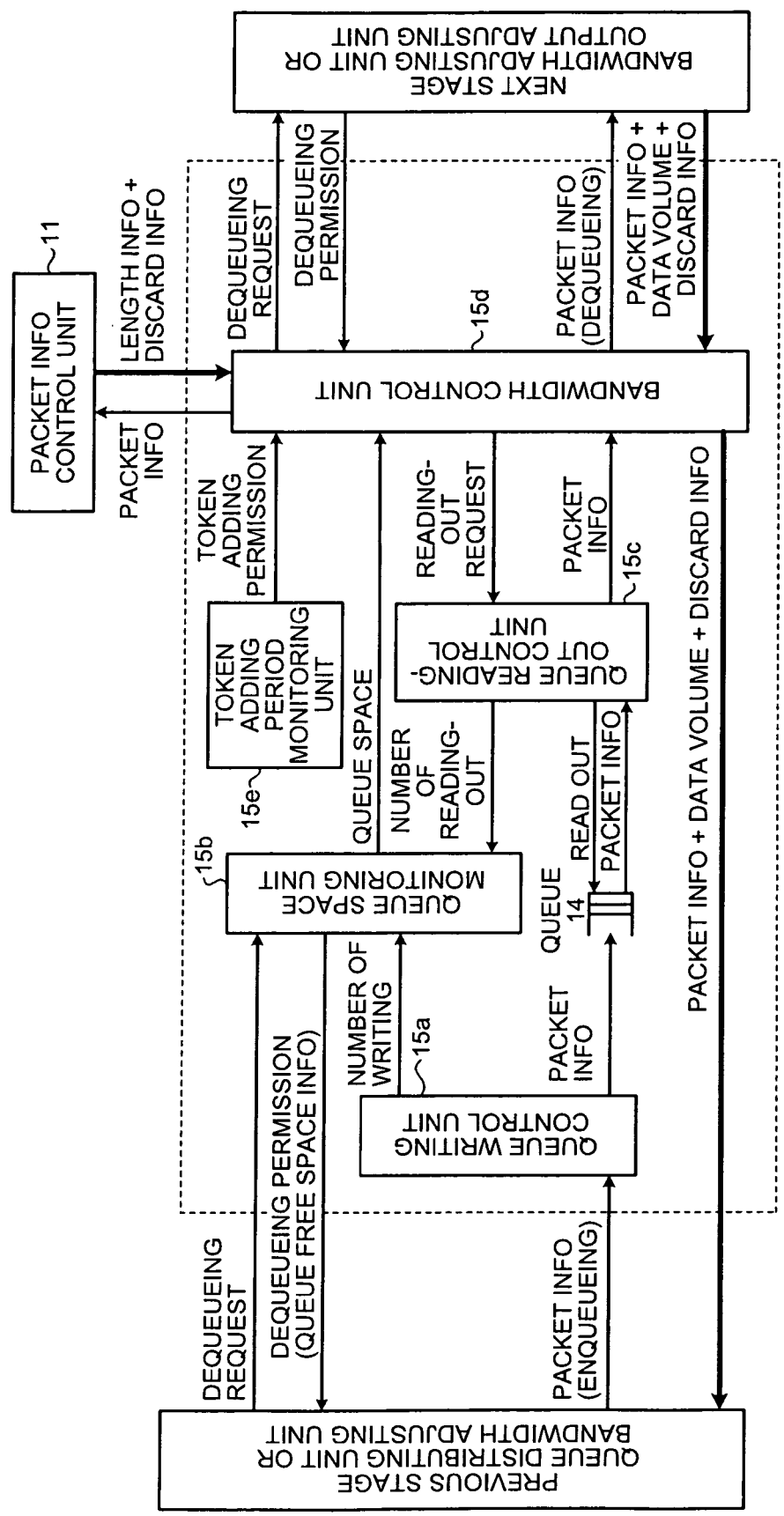

The configuration of a packet relaying apparatus 10 is described with reference to FIGS. 1A and 1B. FIGS. 1A and 1B are block diagrams of the packet relaying apparatus 10 according to the first embodiment. As depicted in FIGS. 1A and 1B, the packet relaying apparatus 10 includes a packet information control unit 11, a shared memory 12, and a scheduler unit 13.

The packet information control unit 11 receives a transmitted packet and manages information on the received packet. Specifically, the packet information control unit 11, upon reception of a packet from each port, extracts (or generates) packet information from the received packet. The packet information is information for determining the destination and the priority order of output. Then, the packet information control unit 11 transmits the extracted packet information to a queue distributing unit 13a of the scheduler unit 13.

The packet information control unit 11 performs processing to write the received packet into the shared memory 12 and processing to monitor a packet length (data volume) in parallel. Thus, the packet information control unit 11 manages the information on packet. The packet information control unit 11, upon reception of the packet information from one of bandwidth adjusting units 13b-1 to 13b-N (hereinafter, reference number "13b" may indicate any one of "13b-1" to "13b-N") of the scheduler unit 13, returns the data volume corresponding to the received packet information together with discard information indicative of whether the received packet has been discarded to the scheduler unit 13.

The packet information control unit 11, upon reception of the packet information from an output adjusting unit 13c of the scheduler unit 13, reads out the corresponding packet from the shared memory 12 and outputs the packet.

The packet information control unit 11 includes a packet information storage unit 11a and a packet staying time monitoring unit 11b as units particularly relevant to the present invention. The packet information storage unit 11a stores the packet information and the data volume together with the discard information with respect to the received packet. Specifically, the packet information storage unit 11a stores the "packet information", the "data volume" indicative of the data volume of the received packet, the "discard information" indicative of whether the received packet has been discarded, and "staying time information" indicative of the staying time of the received packet, in correspondence with one another.

The packet staying time monitoring unit 11b starts monitoring the staying time of the received packet. Specifically, the packet staying time monitoring unit 11b monitors the staying time of each received packet and as a result of monitoring, determines whether the packet has stayed for more than a predetermined time. On determining that the packet has stayed for more than a predetermined time, the packet staying time monitoring unit 11b performs discarding processing on the received packet.

The shared memory 12 holds the received packet received by the packet information control unit 11. Specifically, the packet information control unit 11 performs processing to write the packet into and to read the packet out of the shared memory 12. When the packet information control unit 11 completes the read-out processing of the packet, another packet can be written into an area where the packet has been held in the shared memory 12.

The scheduler unit 13 includes the queue distributing unit 13a, the bandwidth adjusting units 13b-1 to 13b-N, and the output adjusting unit 13c. The scheduler unit 13 performs an output bandwidth adjustment based on the packet information (i.e., the information that determines the destination and the priority order) received from the packet information control unit 11.

The queue distributing unit 13a, on reception of the packet information from the packet information control unit 11, distinguishes the packet information, using the information within the packet information that determines the destination and the priority order, to distribute the packet information to queues 14. Plural queues 14 are implemented each per destination and priority order. The queue distributing unit 13a then performs the processing of writing (enqueueing) the packet information to the queue 14 corresponding to the result of distinguishing.

The bandwidth adjusting units 13b has plural queues 14 and shapers 15 provided by condition such as the destination and the priority order. The bandwidth adjusting unit 13b, at the time of dequeueing by the shaper 15, transmits the packet information to the packet information control unit 11 and thereafter receives the data volume and the discard information of the corresponding packet from the packet information control unit 11.

The bandwidth adjusting unit 13b determines, based on the received discard information, whether the packet has been discarded or not. When the bandwidth adjusting unit 13b determines that the packet has not been discarded, the shaper 15, as ordinary dequeue processing, transmits (dequeues) the packet information to the bandwidth adjusting unit 13b of a next stage (or the output adjusting unit 13c), at a predetermined rate, according to the bandwidth control.

On the other hand, on determining that the packet has been discarded, the bandwidth adjusting unit 13b discards the packet information scheduled to be dequeued and maintains the value of Current Token (indicative of remaining bandwidth usable for output). The bandwidth adjusting unit 13b propagates the "packet information", the "data volume", and the "discard information" of the discarded packet to the bandwidth adjusting unit 13b of a previous stage.

On the other hand, the bandwidth adjusting unit 13b, on reception of the "packet information", the "data volume", and the "discard information" of the discarded packet from the next stage, adds the "data volume" to the Current Token and corrects the discarded bandwidth. The bandwidth adjusting unit 13b transmits the "packet information", the "data volume", and the "discard information" of the discarded packet to the bandwidth adjusting unit 13b of a previous stage, if there is any.

Figure 2A:
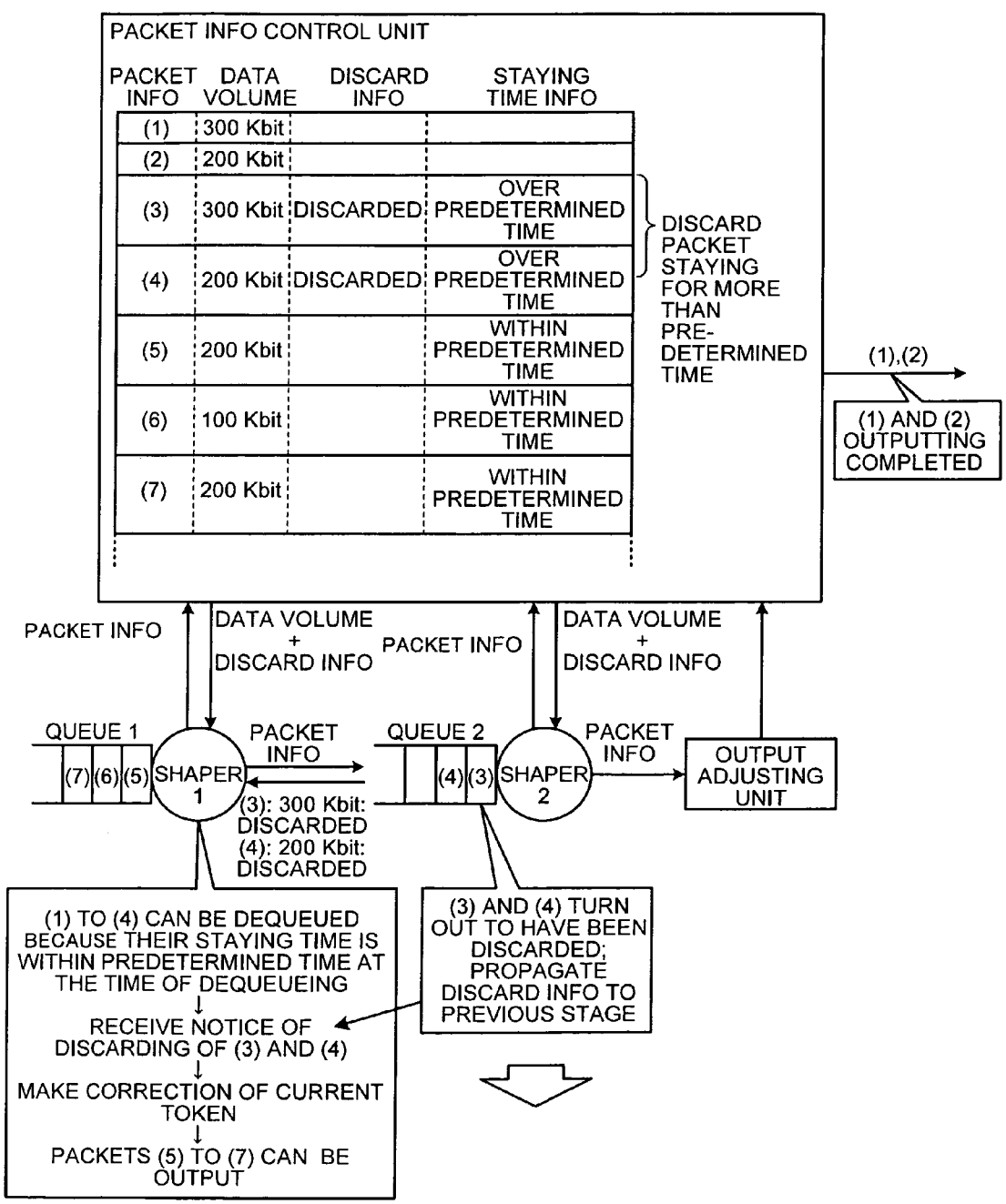
FIGS. 2A and 2B are diagrams for explaining output bandwidth of two shapers.
Figure 2B:
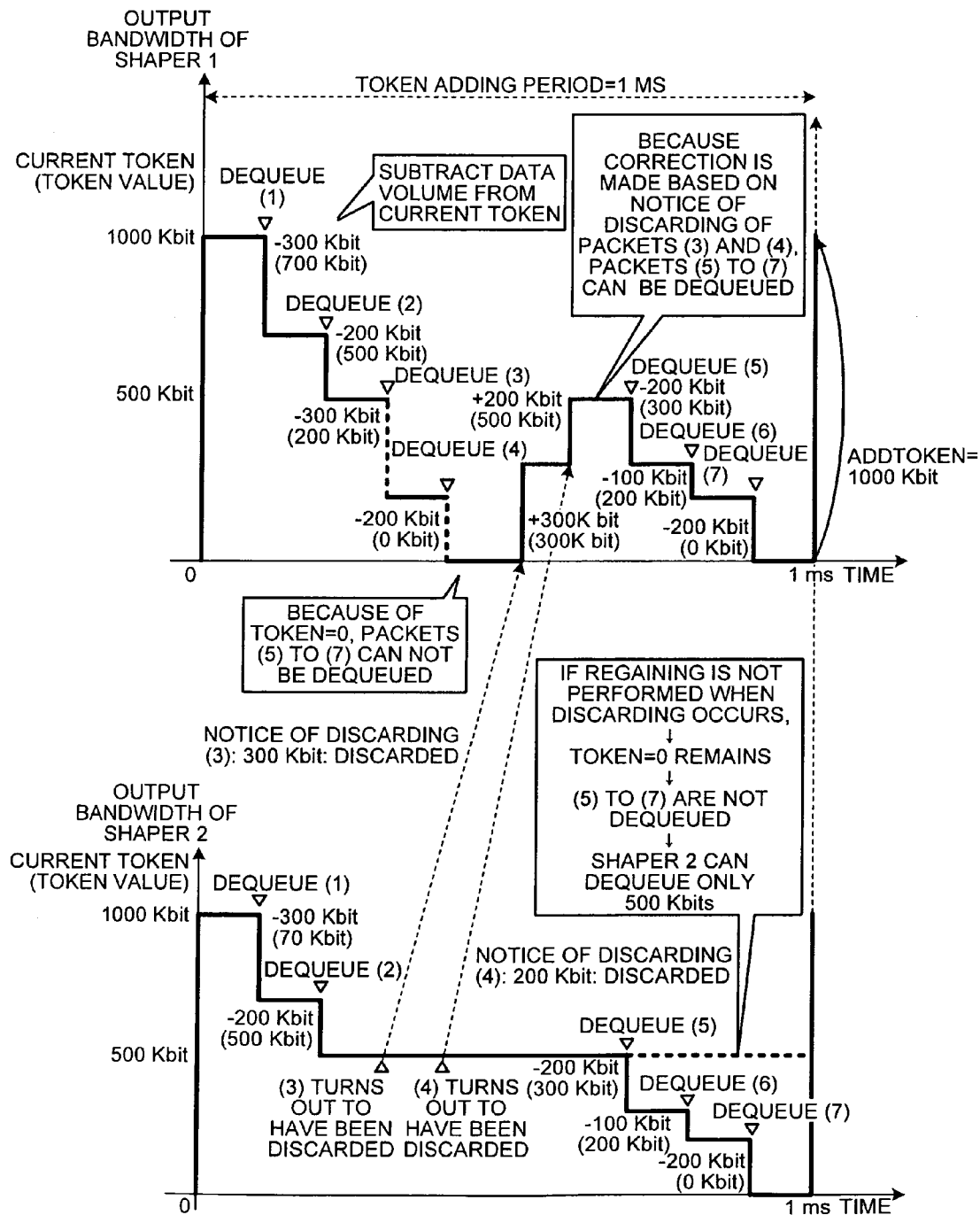

Output bandwidth of two adjacent shapers (shaper 1, shaper 2) will be described by way of example with reference to FIGS. 2A and 2B. As depicted in FIGS. 2A and 2B, the shapers 1 and 2, by outputting 1000 Kbits (Add Token) each in 1 ms (Token adding period), secure 1 Gbps output bandwidth in one second.

Assume that, in the packet relaying apparatus 10 with the above configuration, packets (1) to (7) have been enqueued and are waiting to be dequeued in sequence. In the packet relaying apparatus 10, when the shaper 1 starts dequeueing the packets in ascending order, i.e., starting from packet (1), the packet (2), . . . , in sequence until Token=0, Token=0 occurs at the time when the packet (4) is dequeued. Then, the next packet may not be dequeued until Token>0 occurs (normally, until a next Add Token, if there is no packet discarding).

Likewise, the shaper 2 dequeues the packets until Token=0, but when the shaper 2 tries to dequeue the packets (3) and (4), these packets turn out to be the packets to be discarded. At this moment, the shaper 2, without dequeueing and sending the packet to the output adjusting unit 13c, gives a notice of discarding to the shaper 1 (In FIGS. 1A and 1B, the packet information, the data volume, and the discard information are sent as the notice of discarding).

Upon reception of the notice of discarding, the shaper 1 adds the transmitted data volume (300 Kbits+200 Kbits) to the Current Token. With the addition to the Current Token, Token>0 occurs and the packets (5) to (7) held in a queue 1 may be dequeued. As the shaper 1 dequeues the packets (5) to (7), the shaper 2 also dequeues these packets. Thus, the data volume of 1000 Kbits can be transmitted in 1 ms.

Processing for regaining the output bandwidth is further described in details based on specific values. FIG. 3 illustrates the output bandwidth according to a Token bucket system. In an example depicted in FIG. 3, the shaper is of 1 Gbps output bandwidth, the Token adding period=1 ms, and Add Token=1000 Kbits.

FIG. 3 illustrates transition of the output bandwidth of the shaper in time 0 to 2 ms during which the packets (1) to (14) are dequeued. The shaper receives the notice of discarding for the packets (3), (4), (10), and (11) out of the packets (1) to (14), and regains the bandwidth corresponding to these discarded packets. If the bandwidth is not regained notwithstanding the discarding of the packets, the output data volume would be "(1)+(2)=300 Kbits+200 Kbits=500 Kbits" in a period from 0 ms to 1 ms, and "(8)+(9)=250 Kbits+150 Kbits=400 Kbits" in a period from 1 ms to 2 ms, totaling 900 Kbits, which is less than half of the output data volume achieved when there is no packet discarding (2000 Kbits).

If the discarding occurs at this rate, the shaper uses only 450 Mbps of the bandwidth of 1 Gbps. However, when, as depicted in FIG. 3, if the bandwidth is regained when the packet is discarded, even if the packets (3) and (4) are discarded, the corresponding data volume is regained to allow the dequeueing of the packets (5) to (7). The bandwidth can be regained in the same manner in the period from 1 ms to 2 ms. Thus, 1000-Kbit data can be constantly output and the output bandwidth of 1 Gbps may be secured.

Returning to FIG. 1A, the output adjusting unit 13c makes adjustment so that dequeueing of respective shapers 15 of the bandwidth adjusting unit 13b will not compete with one another and gives a dequeueing permission to respective shapers 15 of the bandwidth adjusting unit 13b. The output adjusting unit 13c, upon reception of the packet information dequeued by the bandwidth adjusting unit 13b, transmits the received packet information to the packet information control unit 11.

An operation of the queue 14 and the shaper 15 during output bandwidth control processing will be schematically described. As depicted in FIG. 1B, upon reception (enqueueing) of the packet information from the bandwidth adjusting unit 13b of the previous stage (or the queue distributing unit 13a), a queue writing control unit 15a writes the packet information to the queue 14 and transmits the number of writing to a queue space monitoring unit 15b.

The queue space monitoring unit 15b monitors how many pieces of packet information are held in the queue, based on the number of writing received from the queue writing control unit 15a and the number of reading-out received from a queue reading-out control unit 15c. The queue space monitoring unit 15b notifies a bandwidth control unit 15d whether any packet information ready to be read out is held in the queue.

The queue space monitoring unit 15b, in response to a dequeueing request received from the bandwidth adjusting unit 13b of the previous stage, gives a dequeueing permission depending on free space of the queue. The bandwidth control unit 15d determines whether the queue 14 has any packet information ready to be dequeued according to a queue space signal received from the queue space monitoring unit 15b.

On determining that the queue 14 has packet information ready to be dequeued, the bandwidth control unit 15d determines whether there is any remaining bandwidth usable for the packet output, based on the Current Token managed in the bandwidth control unit 15d.

On determining that there is remaining bandwidth usable for the packet output, the bandwidth control unit 15d requests the queue reading-out control unit 15c to read out the packet information from the queue 14.

The bandwidth control unit 15d, upon reception from the queue reading-out control unit 15c of the packet information read out from the queue 14, sends a dequeueing request to the bandwidth adjusting unit 13b of the next stage. The bandwidth control unit 15d, upon reception of a dequeueing permission from the bandwidth adjusting unit 13b of the next stage, transmits the packet information read out from the queue 14 to the packet information control unit 11 and receives the data volume and the discard information of the corresponding packet sent back from the packet information control unit 11.

The bandwidth control unit 15d determines from the received discard information whether the packet has been discarded. On determining that the packet has not been discarded, the bandwidth control unit 15d performs the ordinary dequeueing processing.

On the other hand, on determining from the discard information that the packet has been discarded, the bandwidth control unit 15d discards the packet information scheduled to be dequeued and maintains the value of the Current Token (remaining bandwidth usable for output). The bandwidth adjusting unit 13b propagates the "packet information", the "data volume", and the "discard information" of the discarded packet to the bandwidth adjusting unit 13b of the previous stage.

On the other hand, the bandwidth control unit 15d, on reception of the "packet information", the "data volume", and the "discard information" of the discarded packet from the next stage, adds the "data volume" to the Current Token and corrects the discarded bandwidth. The bandwidth adjusting unit 13b transmits the "packet information", the "data volume", and the "discard information" of the discarded packet to the bandwidth adjusting unit 13b of the previous stage, if there is any.

The bandwidth control unit 15d, if there is no remaining bandwidth usable for the packet output, waits for a Token adding permission signal that is sent on a constant cycle from a Token adding period monitoring unit 15e. The bandwidth control unit 15d, upon reception of the Token adding permission signal, applies a Token addition (Add Token) to the Current Token. Thereafter, the bandwidth control unit 15d again determines whether there is any bandwidth usable for the packet output.

The Token adding period monitoring unit 15e issues the Token adding permission on a constant cycle to the bandwidth control unit 15d so that the data volume to be output during a given period of time may be controlled and averaged packet outputting may be performed.

The queue reading-out control unit 15c, upon reception of a request to read out the packet information held in the queue 14 from the bandwidth control unit 15d, performs reading-out processing on the queue 14. The queue reading-out control unit 15c, upon reading-out of the packet information from the queue 14, transmits the packet information to the bandwidth control unit 15d. The queue reading-out control unit 15c then notifies the queue space monitoring unit 15b that the packet information has been read out from the queue 14.

Figure 4:
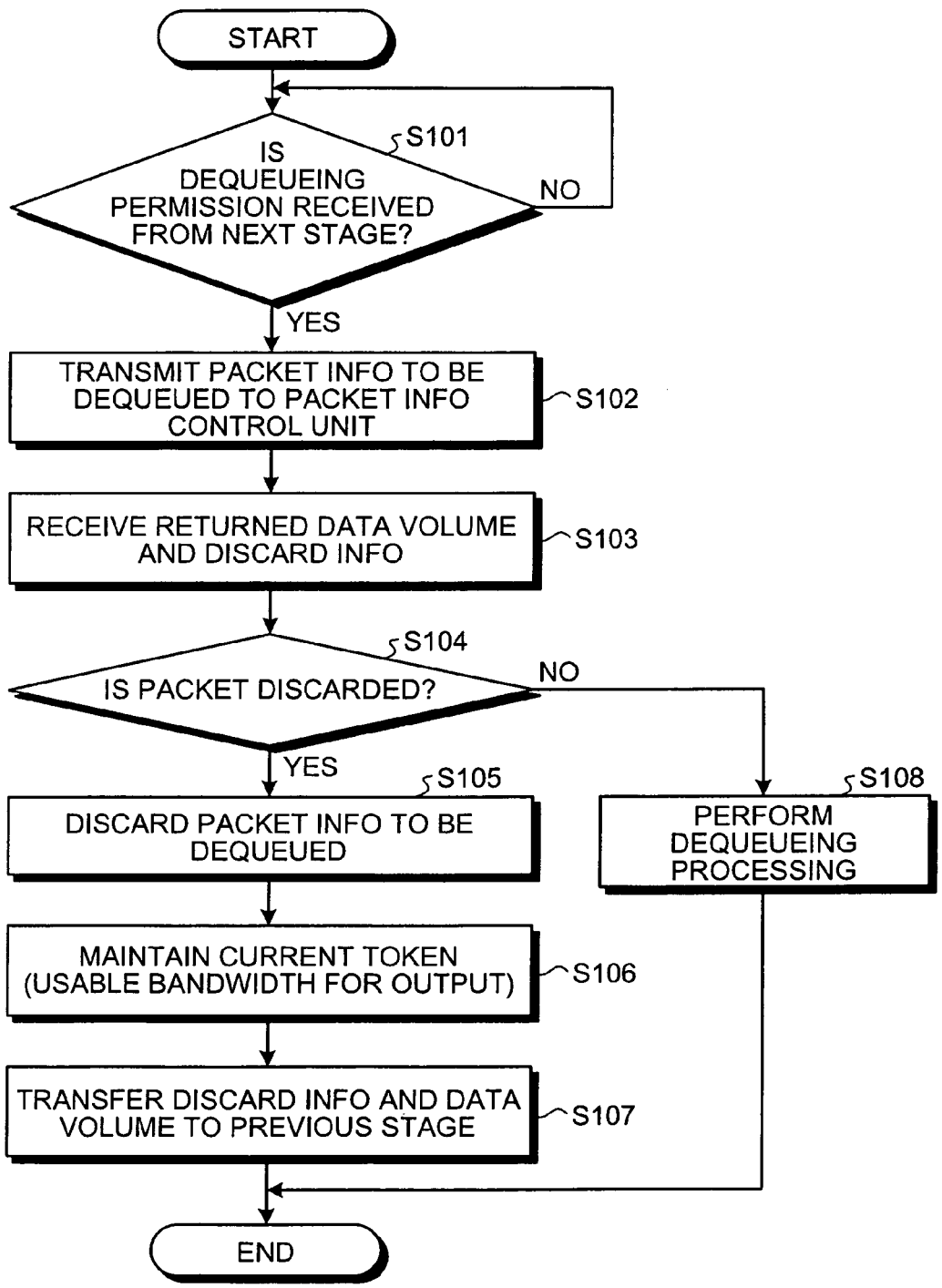
FIG. 4 is a flowchart of a processing procedure of the packet relaying apparatus according to the first embodiment.

Processing performed by the packet relaying apparatus 10 according to the first embodiment will be described referring to FIG. 4. FIG. 4 is a flowchart of a processing operation of the packet relaying apparatus 10 according to the first embodiment.

As depicted in FIG. 4, the bandwidth adjusting unit 13b of the packet relaying apparatus 10, upon reception of the dequeueing permission from the bandwidth adjusting unit 13b of the next stage (step S101: Yes), transmits the packet information read out from the queue 14 to the packet information control unit 11 (step S102). The bandwidth adjusting unit 13b then receives the data volume and the discard information of the corresponding packet from the packet information control unit 11 (step S103).

The bandwidth adjusting unit 13b determines from the received discard information whether the packet has been discarded (step S104) and, on determining that the packet has not been discarded (step S104: No), performs the ordinary dequeueing processing (step S108).

On the other hand, the bandwidth adjusting unit 13b, on determining from the discard information that the packet has been discarded (step S104: Yes), discards the packet information scheduled to be dequeued (step S105) and maintains the value of the Current Token (remaining bandwidth usable for output) (step S106).

The bandwidth adjusting unit 13b transfers the "packet information", the "data volume", and the "discard information" of the discarded packet to the bandwidth adjusting unit 13b of the previous stage (step S107).

As described above, the packet relaying apparatus 10, on determining from the discard information that the received packet has been discarded, discards the packet information to be dequeued, maintains the bandwidth usable for output, and transfers the discard information and the data volume to the bandwidth adjusting unit 13b of the previous stage. The packet relaying apparatus 10, on reception of the discard information and the data volume transferred from the bandwidth adjusting unit 13b of the next stage, adds the data volume to the Token and transfers the discard information and the data volume to the bandwidth adjusting unit 13b of the previous stage. As a result, the packet relaying apparatus 10 can regain the bandwidth corresponding to the discarded packet and improve the efficiency of the output bandwidth.

[b] Second Embodiment

Figure 5:
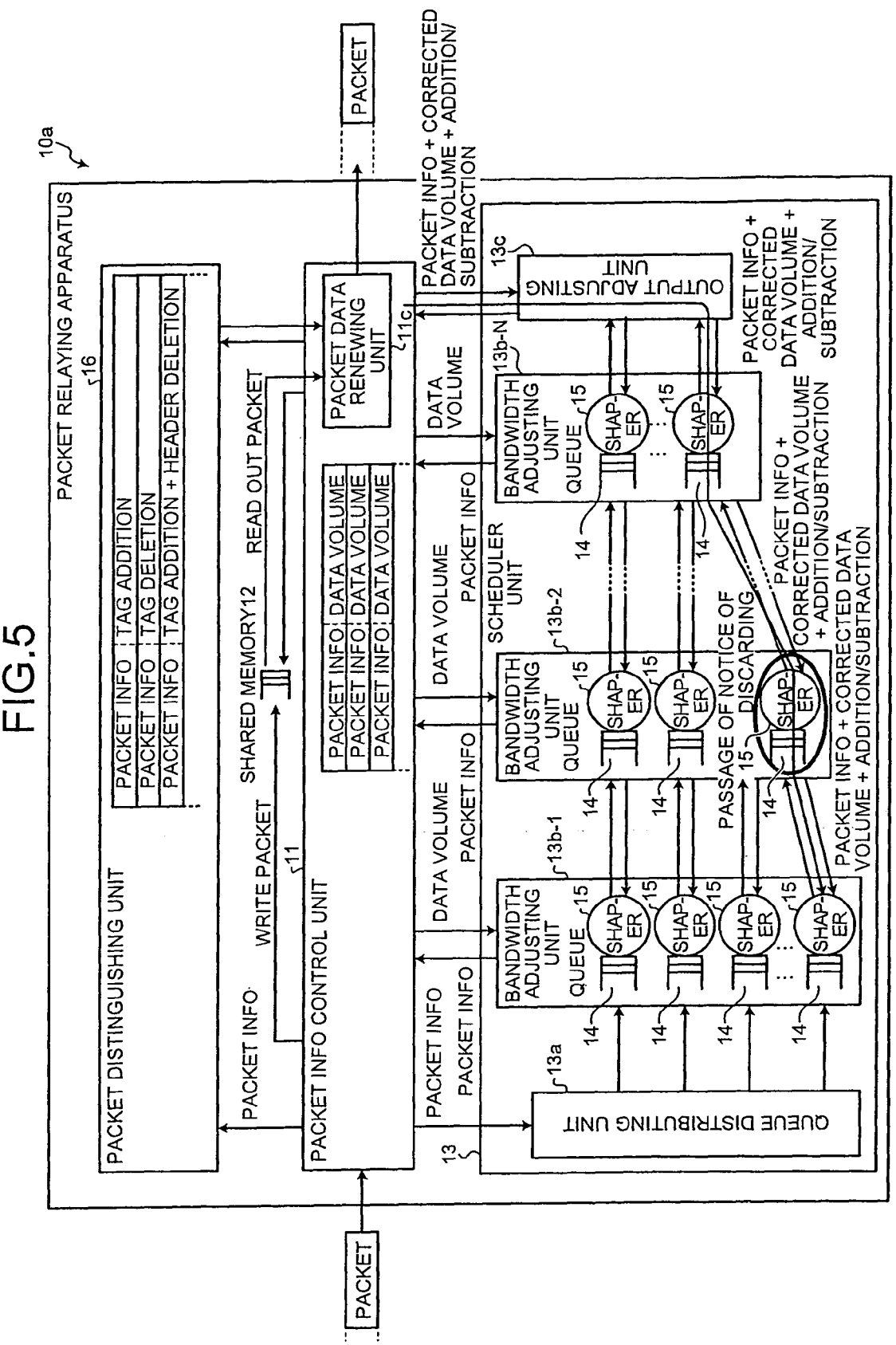
FIG. 5 is a block diagram of a configuration of a packet relaying apparatus according to a second embodiment.

The packet relaying apparatus described above may be an apparatus in which packet distinguishing control, i.e., control for distinguishing the received packet and rewriting the data accordingly, is performed in parallel with the bandwidth control. A second embodiment describes a packet relaying apparatus 10a which further includes a packet distinguishing unit 16 that distinguishes the received packet and rewrites the data with reference to FIG. 5. FIG. 5 is a block diagram of the packet relaying apparatus 10a according to the second embodiment.

As depicted in FIG. 5, the packet relaying apparatus 10a differs from the packet relaying apparatus 10 depicted in FIGS. 1A and 1B in that the packet relaying apparatus 10a further includes the packet distinguishing unit 16. In the packet relaying apparatus 10a, the packet distinguishing unit 16 distinguishes the received packet and performs jobs such as rewriting of a MAC address per destination or counterpart apparatus, addition/deletion of a tag, and addition/deletion of a header, etc., specific to the apparatus.

In the packet relaying apparatus 10a, the data volume of the packet does not change during the rewriting of the MAC address, for example. However, the data volume of the packet changes during processing such as the addition or deletion of the tag and the addition or deletion of the header.

When the data volume is corrected and changed, the packet distinguishing unit 16 of the packet relaying apparatus 10a transmits distinguishing information of the received packet to which the correction is made to a packet data renewing unit 11c of the packet information control unit 11.

The packet data renewing unit 11c, upon reception of the distinguishing information of the received packet from the packet distinguishing unit 16, notifies the output adjusting unit 13c of the scheduler unit 13 of the packet information corresponding to the received packet of the received distinguishing information, corrected data volume of the received packet, and addition/subtraction information as a correction notice.

The output adjusting unit 13c propagates the correction notice (packet information, corrected data volume, and addition/subtraction information) to the shapers 15 in sequence, from the shaper 15 of a later stage to the shaper 15 of an earlier stage. The shaper 15 receiving the correction notice makes correction (addition/subtraction) of the Token according to the corrected data volume as received, in the same manner as when receiving the discard information.

Because the Token is corrected according to the correction data, the efficiency of the output bandwidth can be improved regardless of the manner of change in the data volume of packet.

[c] Third Embodiment

While the packet relaying apparatus 10 of the first embodiment performs the bandwidth regaining processing by the shaper, the present invention is not limited to the manner described in the first embodiment. Alternatively, the bandwidth regaining processing may be performed by a DRR (Deficit Round Robin) circuit.

Figure 6:
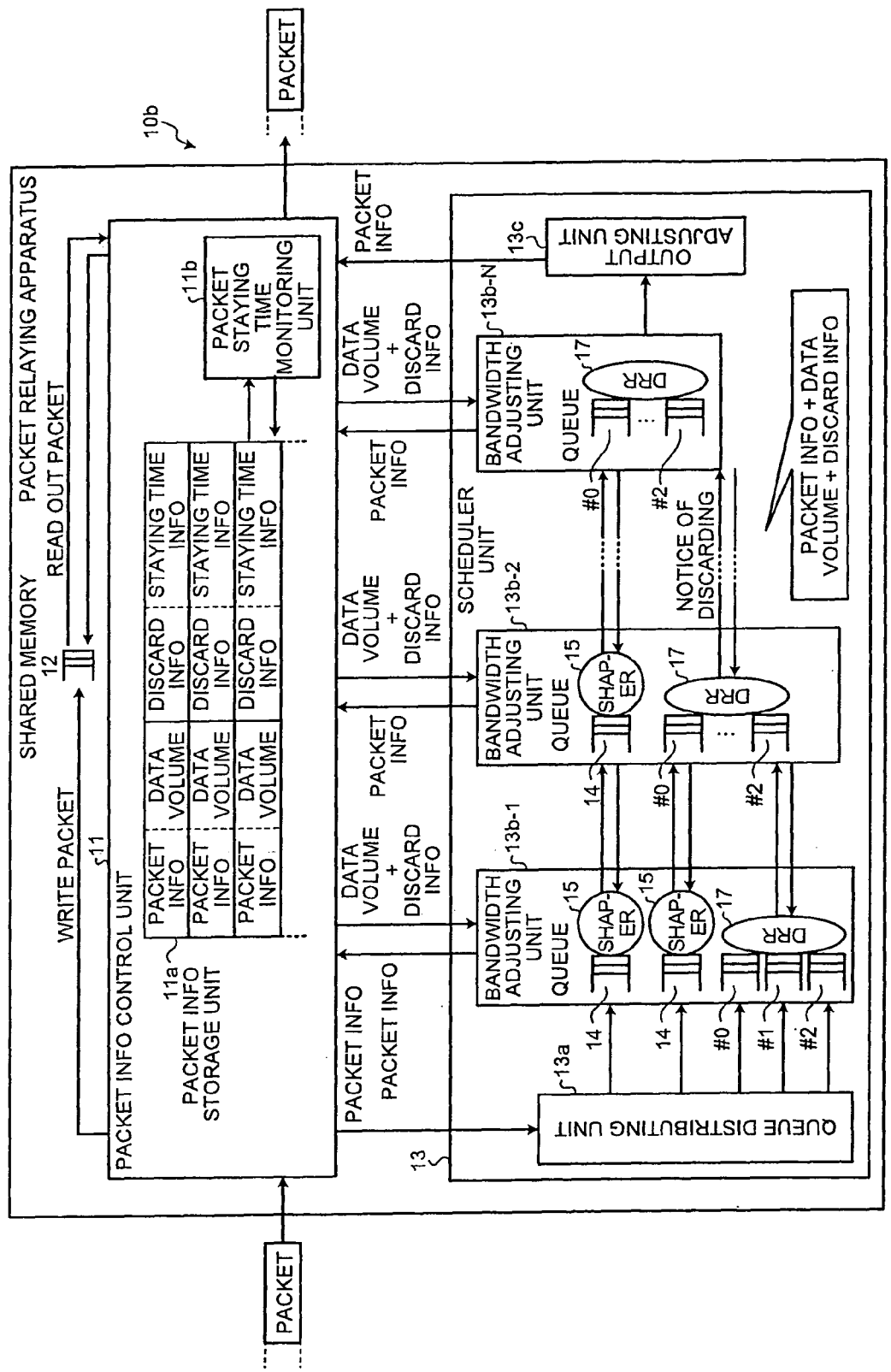
FIG. 6 is a block diagram of a configuration of a packet relaying apparatus according to a third embodiment.

A packet relaying apparatus 10b according to a third embodiment performs the bandwidth regaining processing by a DDR circuit. A configuration and processing of the packet relaying apparatus 10b are described with reference to FIGS. 6 and 7. FIG. 6 is a block diagram of the configuration of the packet relaying apparatus 10b according to the third embodiment, and FIG. 7 is a diagram for explaining the bandwidth regaining processing of the DRR circuit.

A DRR 17 of the packet relaying apparatus 10b dequeues the packet according to the weight assigned to respective queues as depicted in FIG. 6. Namely, in the example of FIG. 6, the DRR 17 is provided with three queues of queue #0 to queue #2.

Figure 7:
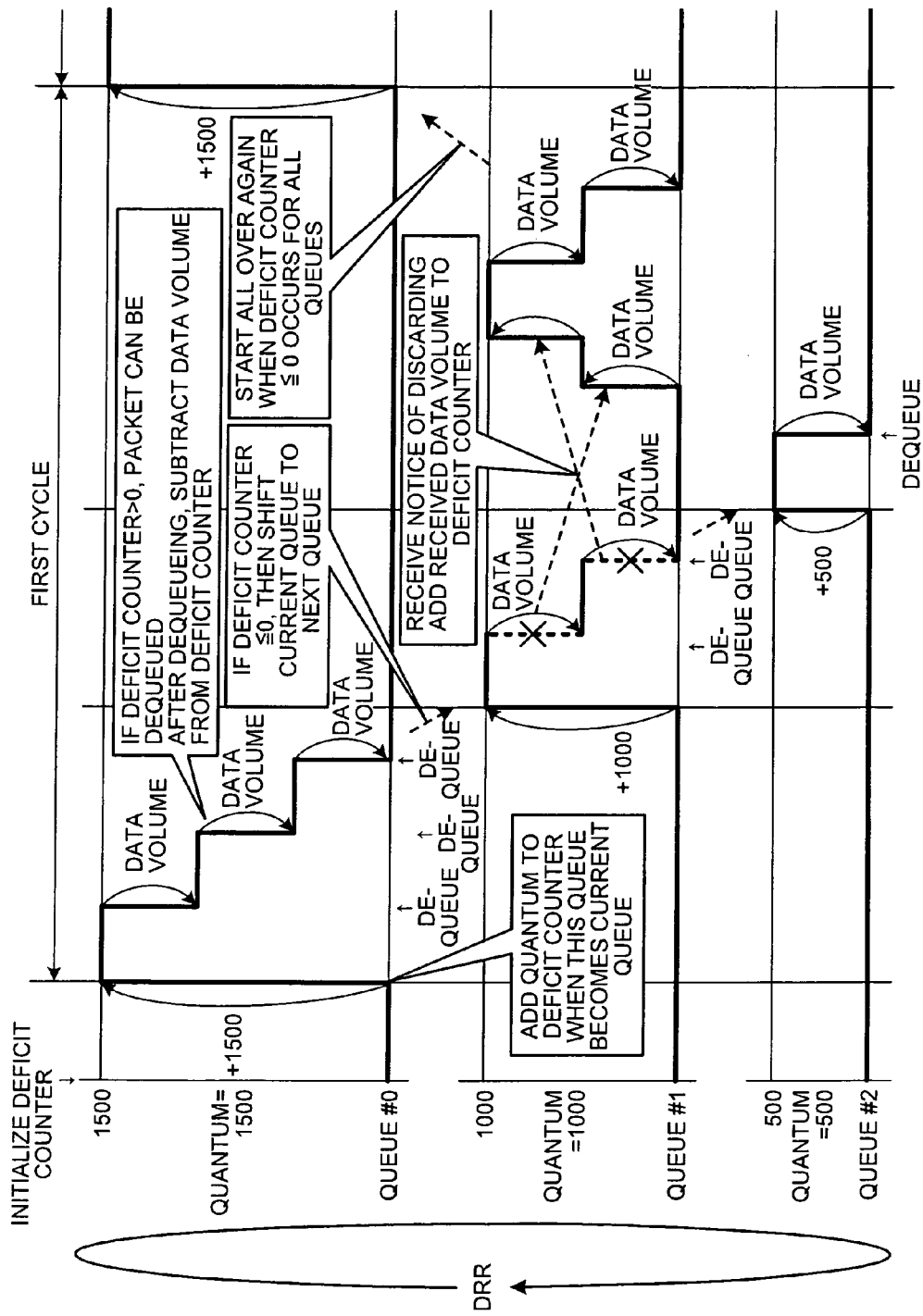
FIG. 7 is a diagram for explaining bandwidth regaining processing of a DRR circuit.

In the example of FIG. 7, queues are weighted at the ratio of "queue #0:queue #1:queue #2=1500:1000:500". In the ordinary processing, the DRR 17 dequeues the packets according to the weighting until Deficit Counter≦0 occurs, in the order of the queues starting from queue #0. When the last (queue #2) Deficit Counter≦0 occurs, the DRR 17 goes back to the beginning (queue #0) and restarts the dequeueing of the packets according to the weighting.

In an example depicted in FIG. 7, the packets output from the queue #1 are discarded at the next stage. If discarded data volume is not regained, the ratio of the output packets will be queue #0:queue #1:queue #2=1500:0:500 and it does not appear that the packet of queue #1 is being output (weighting is complied with).

Therefore, the packet relaying apparatus 10b is designed to have a function of regaining the discarded data volume. The DRR 17 of the packet relaying apparatus 10b receives a notice of discarding (the packet information, the data volume, and the discard information) from the next stage when the packet is discarded.

The DRR 17, upon reception of the notice of discarding, selects an applicable Deficit Counter based on the packet information contained in the received notice of discarding and adds the data volume thereto. Thus, the DRR 17 can dequeue the data from the queue corresponding to this Deficit Counter by the added data volume, and perform the dequeueing until the Deficit Counter≦0 occurs.

By performing this processing, the ratio of output packets is "queue #0:queue #1:queue #2=1500:1000:500", which represents the outputting with the weighting being complied with.

According to the third embodiment, even if the DRR is used in place of the shaper, the packet may be output at the ratio of high accuracy.

[d] Fourth Embodiment

While the embodiments of the present invention have so far been described, the present invention may be realized in a variety of different manners other than the above embodiments. Accordingly, other embodiments of the present invention are described below as a fourth embodiment.

[d-1] System Configuration, Etc.

Each constituent component of each apparatus illustrated by the drawings is function-conceptual and is not necessarily required to be physically configured as illustrated. Namely, a specific form of distribution/integration of each apparatus is not limited to the one illustrated and it may be configured so that all or part thereof is functionally or physically distributed or integrated, by arbitrary unit, depending on various loads and the situation of use. Further, each processing function performed in each apparatus may have all or an arbitrary part thereof realized by a CPU and a program analyzed and executed by the CPU or realized as hardware by a wired logic.

Out of the processing described in the present embodiments, all or part of the processing described as being performed automatically may be performed manually and all or part of the processing described as being performed manually may be performed automatically by a known method. Additionally, the processing procedure, the control procedure, specific names, and information containing various data and parameters shown in the above description and drawings may be arbitrarily changed except where specifically indicated.

[d-2] Program

Figure 8:
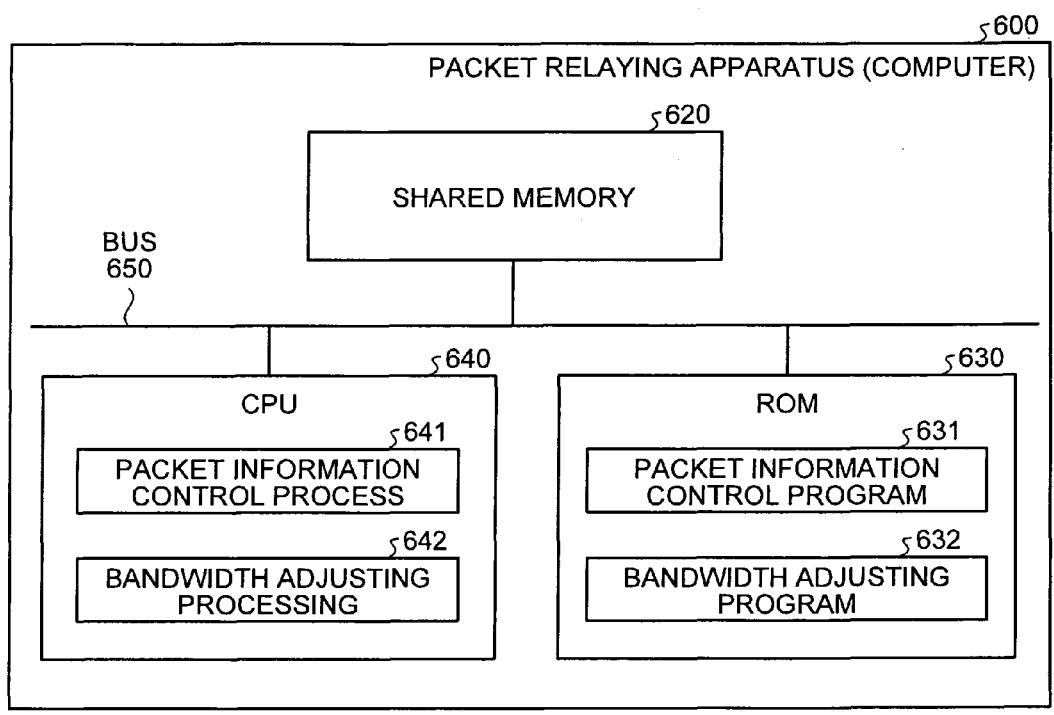
FIG. 8 is a diagram of a computer executing a packet relaying program.
Figure 9A:
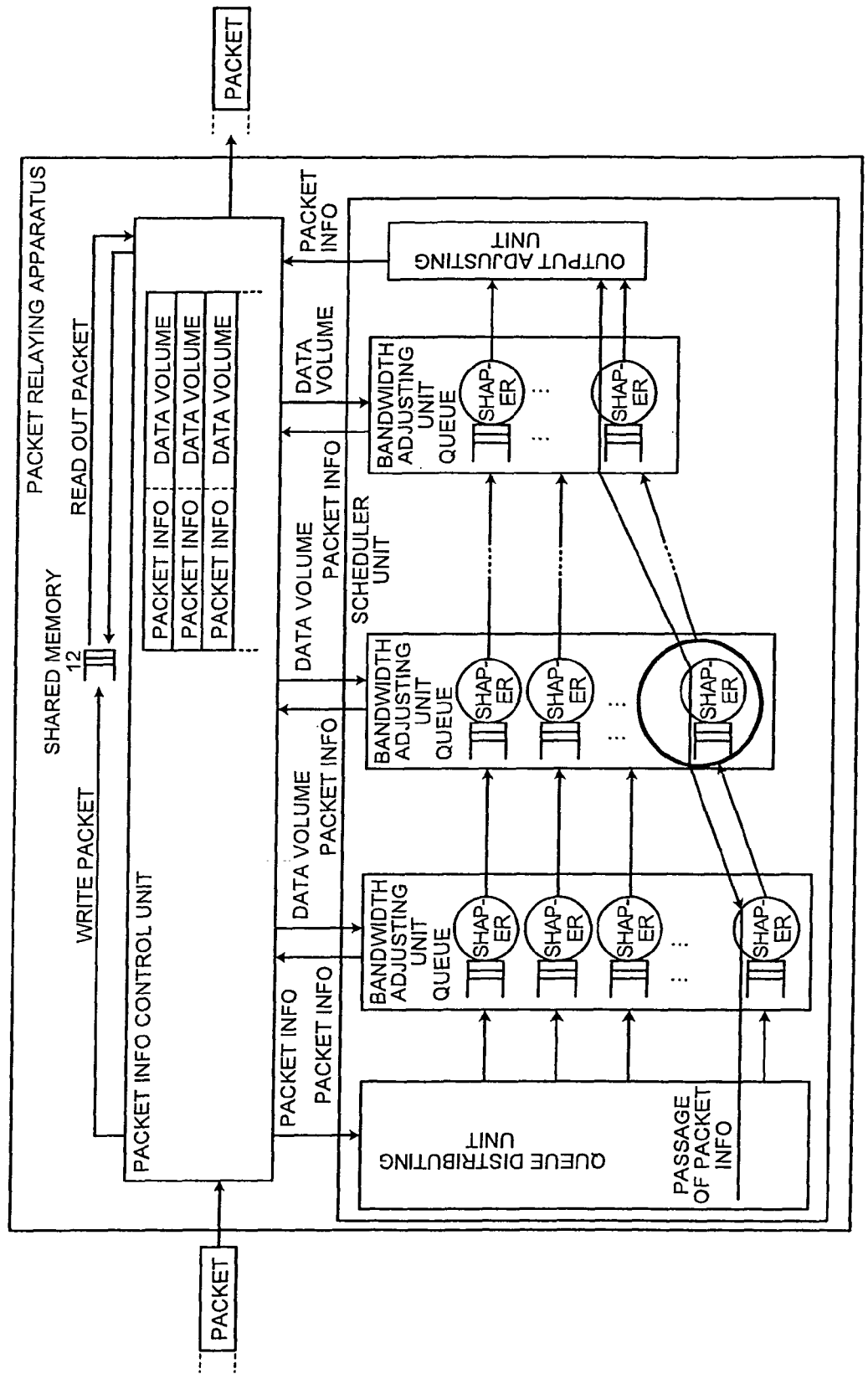
FIGS. 9A and 9B are diagrams for explaining a conventional technology.
Figure 9B:
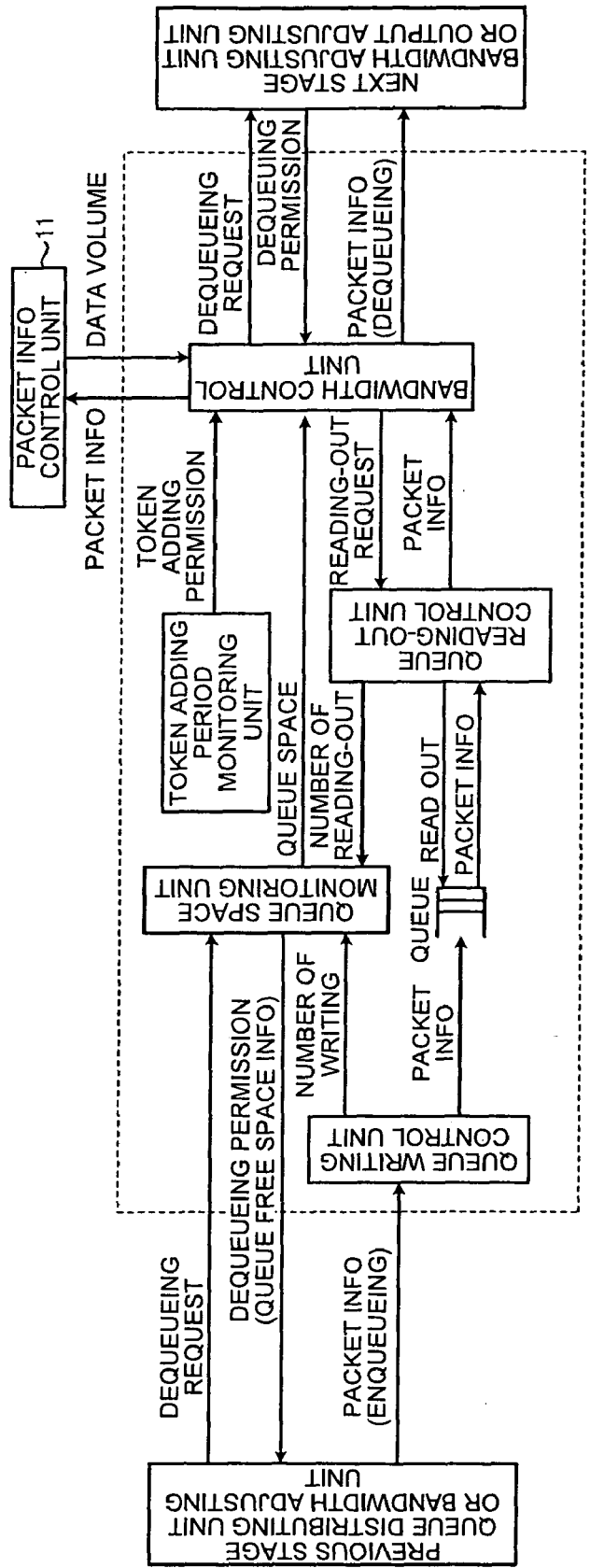

Incidentally, various processing described in the above embodiments may be realized by executing a prearranged program on a computer. Therefore, the following describes one example of the computer executing the program having the same function as that of the above embodiments. FIG. 8 is a diagram of a computer executing a packet relaying program.

As depicted in FIG. 8, a computer 600 as a packet relaying apparatus is configured to have a shared memory 620, a ROM 630, and a CPU 640 connected by a bus 650.

The ROM 630 stores in advance the packet relaying program that performs the same function as that of the above embodiments, namely, a packet information control program 631 and a bandwidth adjusting program 632 as depicted in FIG. 8. The programs 631 and 632 may be integrated or distributed appropriately in the same manner as each constituent component of the packet relaying apparatus depicted in FIGS. 1A and 1B.

With the CPU 640 reading out these programs 631 and 632 from the ROM 630 and executing them, the programs 631 and 632 come to function as a packet information control process 641 and a bandwidth adjusting process 642. The processes 641 and 642 correspond respectively to the packet information control unit 11 and the bandwidth adjusting unit 13b depicted in FIG. 1A.

The shared memory 620 is provided as depicted in FIG. 8. The shared memory 620 corresponds to the shared memory 12 depicted in FIG. 1A.

The packet relaying apparatus according to the embodiments has an effect of regaining the bandwidth for the discarded packet and improving the efficiency of the output bandwidth.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relaying apparatus comprising:
plural queues that hold packet information temporarily;
plural queue control units that control dequeueing, dequeueing being transmission of packet information from a queue of a previous stage to a queue of a next stage;
a packet information control unit that, on receiving packet information to be dequeued at the time of dequeueing, returns discard information indicative of whether a received packet corresponding to the packet information has been discarded and data volume of the received packet;
a first bandwidth adjusting unit that, on determining that the received packet has been discarded according to the discard information returned by the packet information control unit, discards the packet information to be dequeued, maintains a usable bandwidth for output, and transfers the discard information and the data volume to the queue control unit of the previous stage; and
a second bandwidth adjusting unit that, on receiving the discard information and the data volume transferred from the queue control unit of the next stage, adds the data volume to the usable bandwidth for output and transfers the discard information and the data volume to the queue control unit of a previous stage.

2. The packet relaying apparatus according to claim 1, further comprising:

a packet distinguishing unit that, when a correction of the data volume has been made to the received packet, transmits distinguishing information of the received packet to which the correction has been made to the packet information control unit, wherein the packet information control unit transmits corrected data volume of the received packet corresponding to the distinguishing information transmitted by the packet distinguishing unit to the first bandwidth adjusting unit, the first bandwidth adjusting unit corrects the usable bandwidth for output, using the corrected data volume transmitted from the packet information control unit and transfers the corrected data volume to the queue control unit of the previous stage, and the second bandwidth adjusting unit, on receiving the corrected data volume transferred from the queue control unit of the next stage, corrects the usable bandwidth for output, using the corrected data volume and transfers the corrected data volume to the queue control unit of the previous stage.

3. The packet relaying apparatus according to claim 1, wherein the plural queue control units are shapers of a multi-stage configuration, the first bandwidth adjusting unit, on determining according to the discard information returned by the packet information control unit that the received packet has been discarded, discards the packet information to be dequeued, maintains a Token, and transfers the discard information and the data volume to the shaper of the previous stage, and the second bandwidth adjusting unit, on receiving the discard information and the data volume transferred from the shaper of the next stage, adds the data volume to the Token and transfers the discard information and the data volume to the shaper of the previous stage.

4. The packet relaying apparatus according to claim 1, wherein the plural queue control units include one Deficit Round Robin circuit (DRR) in each stage, the first bandwidth adjusting unit, on determining according to the discard information returned by the packet information control unit that the received packet has been discarded, discards the packet information to be dequeued, maintains a counter, and transfers the discard information and the data volume to the DRR of the previous stage, and the second bandwidth adjusting unit, on receiving the discard information and the data volume transferred from the DRR of the next stage, adds the data volume to the counter and transfers the discard information and the data volume to the DRR of the previous stage.

5. A packet relaying method comprising:

controlling packet information by, on receiving packet information to be dequeued at the time of dequeueing, returning discard information indicative of whether a received packet corresponding to the packet information has been discarded and data volume of the received packet, dequeueing being transmission of packet information from a queue of a previous stage to a queue of a next stage;

firstly adjusting bandwidth by, on determining that the received packet has been discarded according to the discard information returned as part of controlling packet information, discarding the packet information to be dequeued, maintaining a usable bandwidth for output, and transferring the discard information and the data volume to a queue control unit of the previous stage; and secondly adjusting bandwidth by, on receiving the discard information and the data volume transferred from the queue control unit of the next stage, adding the data volume to the usable bandwidth for output, and transferring the discard information and the data volume to the queue control unit of a previous stage.

6. A computer program product having a non-transistory computer readable medium including programmed instructions for packet relaying, wherein the instructions, when executed by a computer, causes the computer to perform:

controlling packet information by, on receiving packet information to be dequeued at the time of dequeueing, returning discard information indicative of whether a received packet corresponding to the packet information has been discarded and data volume of the received packet, dequeueing being transmission of packet information from a queue of a previous stage to a queue of a next stage;

firstly adjusting bandwidth by, on determining that the received packet has been discarded according to the discard information returned as part of controlling packet information, discarding the packet information to be dequeued, maintaining a usable bandwidth for output, and transferring the discard information and the data volume to a queue control unit of the previous stage; and secondly adjusting bandwidth by, on receiving the discard information and the data volume transferred from the queue control unit of the next stage, adding the data volume to the usable bandwidth for output and transferring the discard information and the data volume to the queue control unit of a previous stage.

* * * * *

UNITED STATES PATENT AND TRADEMARK OFFICE
CERTIFICATE OF CORRECTION

| | | |
|---|---|---|
| PATENT NO. | : 7,885,280 B2 | |
| APPLICATION NO. | : 12/320488 | |
| DATED | : February 8, 2011 | |
| INVENTOR(S) | : Hideyo Fukunaga et al. | |

It is certified that error appears in the above-identified patent and that said Letters Patent is hereby corrected as shown below:

Column 12, Line 25 in Claim 6, delete "non-transistory" and insert -- non-transitory --, therefor.

Signed and Sealed this
Twenty-sixth Day of April, 2011

David J. Kappos
*Director of the United States Patent and Trademark Office*